United States Patent [19]
Böttinger et al.

[11] Patent Number: 5,913,801
[45] Date of Patent: Jun. 22, 1999

[54] AGRICULTURAL BALER, AND METHOD OF BALING

[75] Inventors: Stefan Böttinger, Bielefeld; Thilo Steckel; Helmut Homburg, both of Harsewinkel, all of Germany

[73] Assignee: Robert Bosch GmbH, Stuttgart, Germany

[21] Appl. No.: 08/751,873

[22] Filed: Nov. 18, 1996

[30] Foreign Application Priority Data

Nov. 22, 1995 [DE] Germany ................ 195 43 343

[51] Int. Cl.⁶ .................. A01D 75/28; A01D 39/00
[52] U.S. Cl. .................... 56/10.2 R; 56/341
[58] Field of Search ............ 56/341, 343, 432, 56/433, 10.2 R, DIG. 15; 100/88, 99; 172/19, 20

[56] References Cited

U.S. PATENT DOCUMENTS

| | | | |
|---|---|---|---|
| 2,982,201 | 5/1961 | Kruger et al. | 100/99 |
| 3,126,069 | 3/1964 | Shepley | 100/99 X |
| 4,296,409 | 10/1981 | Whitaker et al. | 56/10.2 R |
| 4,362,097 | 12/1982 | Rogers | 100/99 |
| 4,611,535 | 9/1986 | Anstey et al. | 56/341 X |
| 4,706,445 | 11/1987 | Woolsey | 56/341 X |
| 4,742,880 | 5/1988 | Schrag et al. | 100/99 X |
| 4,929,904 | 5/1990 | Bohman et al. | 56/10.2 R |
| 5,083,976 | 1/1992 | McClure et al. | 56/10.2 R |
| 5,165,332 | 11/1992 | Lee | 100/88 |
| 5,165,617 | 11/1992 | Van Vuuren | 172/20 X |
| 5,173,079 | 12/1992 | Gerrish | 56/10.2 R |
| 5,384,436 | 1/1995 | Pritchard | 100/99 X |
| 5,666,793 | 9/1997 | Bottinger | 56/10.2 R |
| 5,685,772 | 11/1997 | Anderson et al. | 56/10.2 R |

FOREIGN PATENT DOCUMENTS

WO 86/05353   9/1986   WIPO .

*Primary Examiner*—Anthony Knight
*Assistant Examiner*—Gary Grafel
*Attorney, Agent, or Firm*—Mihcael J. Striker

[57] ABSTRACT

In a device and a method, a position-accurate detection of product mass received by a baler is possible, by an electronic control and regulating device in association with determination of a load of a working element of the baler.

24 Claims, 1 Drawing Sheet

AGRICULTURAL BALER, AND METHOD OF BALING

BACKGROUND OF THE INVENTION

The present invention relates to a device for and a method of baling with the use of balers.

More particularly, it relates to a device for and a method of baling, with which a position-accurate determination of a weight of the received mass is possible. The balers in accordance with the present invention are used for example in agriculture.

For mobile harvesters it has been proposed in the patent document WO861055353 to derive a yield card from the quantity of the harvested product mass. Based on this idea, several arrangements have been developed for detecting the quantity of the harvested products on a harvester thresher. For example, some arrangements are disclosed in the patent applications DE41 05 857, DE 38 07 492 and DE 30 45 728. A weighing device for balers is proposed in the German patent document DE 44 36 128.

Balers which are used in agriculture receive nowadays a harvested product swath over several hundred meters before it can be bound in a finished bale. If the weighing of the bale is considered as satisfactory as a measuring method for determining partial-area-specific yield, a release of the yield card is performed, which is assembled from the counted width of the received swath and the several hundred meter long receiving length for forming a bale. Such a resolution is however is too coarse for a partial-area-specific maintenance of agricultural areas.

SUMMARY OF THE INVENTION

Accordingly, it is an object of the present invention to provide a device for and a method of baling, which avoids the disadvantages of the prior art.

More particularly, it is an object of present invention to provide a device for and a method of bailing, which allows a high resolution of the yield measurement for a partial-area-specific maintenance of agricultural areas during baling.

In keeping with these objects and with others which will become apparent hereinafter, one feature of the present invention resides, briefly stated, in a baler with an electronic monitor and/or control device connected with a known sensor means which, during forming a bale, detects the absolute and/or relative loading of the working element of the baler, and is connected with a device for determination of actual position of the baler which associates position values associated with the loading values, which intermediately stores the absolute or relative loading value of a position, which is connected with a weighing device to weight the finally bound agricultural product bales, and which, based on the weight of the finished bound bale and the absolute and/or relative position loading value, determines a weighed position-accurate value of the received product mass. The baler can be formed as a self-propelling or pulled round baler or large baler, a high pressure baler or a compact roller baler.

In accordance with a further feature of the present invention, the electronic control and/or regulating device and/or the device for detecting the geographic position of the baler are arranged on the baler oron the pulling vehicle, if the latter is available. The known sensor means for detecting the absolute and/or relative loading of the working element of the baler detects the loading value by means of strain a measuring strips, rotary speed sensors, pressure sensors, temperature sensors or similar sensors, which are arranged on drive shafts or chains, piston rods, receiving, cutting transporting pre-compacting, preparing and/or pressing devices the sensor means for determining the absolute and/or relative loading of the working element of the baler can also sense the volume of the received product mass by acoustic, capacitive, mechanical, and/or optical sensors, such as for example ultrasound, laser or video sensors. The weighing device determines the weight value on a drawn bar, on one or several axles, on an outputting device, on a suspended collecting car, or during later lifting of a deposited bale by another working machine for transportation. Known devices for calibration of the weighing device can be arranged on the baler.

The individual elements of the control and/or regulating device, the position detecting device, the sensor means and the weight device are connected for example by a CAN-BUS-Network. The electronic control and/or regulating device recalculate the position-accurate associated weight values of the received product mass and put it into a digital yield card. The position-accurate weight value of the received product mass and/or the digital yield card are supplied by the electronic control and/or regulating device via cable, telemetrically and/or by means of known storage elements, such as for example chip cards, diskettes, magnetic tapes, compact disks, etc. to an electronic indicating/or evaluating unit. Moreover, sensors can be arranged in the baler when the predetermined product mass characteristics, for example the moisture, are determined, the determined characteristics are transferred to the electronic control and/or regulating device, which stores the transmitted value or transmits them to the indicating and/or evaluating device. Instead of a baler, the inventive device can be installed also on a green product mat machine which has no binding device and continuously lays the supplied harvested product. In this case, the weight value of the continuously discharged green product mat is measured and supplied to the electronic control and/or regulating device.

The inventive method for position-accurate detection of the product mass received by a baler resides in that, the electronic monitoring and/or control device of a baler during the formation of a product bale measures the absolute and/or relative loading of the working element, the corresponding associated geographical position of the baler, and the weight of the finished bale, and from the measurements calculates for the corresponding geographical position and in accordance with a suitable computing function, a weighed position-accurate value of the received product mass.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
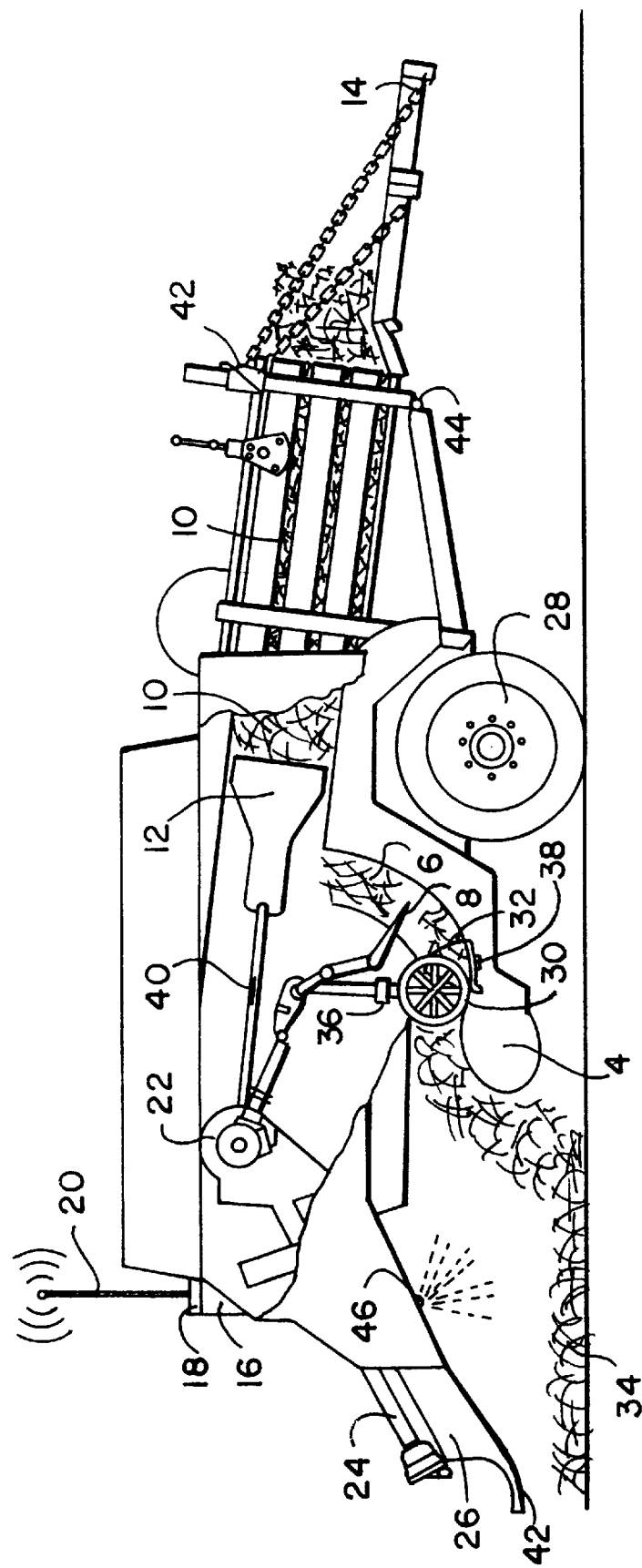
FIG. 1 is a view schematically showing a baler in accordance with the present invention.

FIG. 1 shows an inventive baler 2. The baler 2 has a receiving device 4, a feeding passage 6, a picker 8, a pressing chamber 10. A pressing piston 12, a discharge device 14, and electronic control and/or regulating device 16, a position detecting unit 18 provided with an antenna 20, a main transmission 22 which is connected in a driving manner with a pulling vehicle through a drive shaft 24, as well a hitch 26 and a ground drive 28.

The baler 2 is provided with a cutting device composed of a cutting rotor 30 and associated cutters 32. A swath 34 located on the ground is transported from the receiving device 4 into a supply opening of the feeding passage 6, is cut there by the cutting rotor 30 and cutters 32, is transported further by the feeding device 8 through the feeding passage 6, and is lifted in the pressing chamber 10. In the pressing chamber the pressing piston 12 compresses the material to form a strand of the product mass which is provided at a preselected length with a binding means from a not shown binding device. The finally bound bales are layed by the discharging device 14 on the field.

The electronic control and/or regulating device 16 is connected through connecting conductors with different sensors for measurement of the absolute or relative loading of the working element. For example, the drive load of the cutting rotor 30 can be measured on the drive shaft of the cutting device by a sensor 36, and simultaneously the pressure feeler or sensor 38 measures the transporting pressure of the product mass to be cut on the cutter 32. A rotary sensor is arranged in the main housing 22 determines the rotary speed differences which occur due to the alternating loading of the working element. Moreover, the expansion measuring strips 40 are arranged on the connecting rod of the pressing piston 12. Additionally, the working pressure of the hydraulic cylinder-piston unit is monitored by a pressure sensor 42, which applies a counter pressure to the work of the pressing piston by narrowing of the pressure chamber proposed sensors as well as the mounting points are given only exemplary. Instead, other known sensors or other measuring points can be selected for determination of the absolute or relative machine loading. For realization of the invention, it suffices to utilize only one of the proposed sensors for determination of the absolute or relative loading of the working element. Combination of the several sensors provides however the advantage that, from the greater available data pool, an accurate loading value can be determined with filtering out of possible disturbing values.

The electronic control and/or regulating device 16 is connected with a device for detecting the actual position of the baler Such a device can be composed for example of a GPS system However, also other known navigation systems or a combination of the same having a sufficient accuracy can be utilized for the present invention. Moreover, devices for detecting the weight of a finished bound bale are arranged on the baler. A pressure sensor 42 measuring the corresponding supporting load with which the baler is supported on the hitch is located on the hitch itself. Moreover, a pressure sensor 44 is mounted on the support at the end of the pressing passage for detecting the weight of the bale located at the outlet of the pressing passage. Also, weight sensors are mounted on the ground drive 28 of the baler 2, which measure the weight of the baler on the axle. The proposed three measuring devices can measure the weight of a bale individually or together.

In a large baler, it is necessary to consider that in addition to the product mass accommodated in the finally bound bale, further product mass is located in the supply passage, in the pressing chamber, and also possibly on the discharge device. For obtaining a concrete weight value for a finished bound bale, it is proposed to measure the weight unloading of the baler directly after the discharge of the bale onto the field. The measured weight unloading value corresponds to the weight of the discharge bale. It is however also conceivable to guarantee by the corresponding transporting devices that always only a finished bound bale is located on the discharge device 14 and thereby possible disturbing influences are maintained as low as possible.

During the utilization of weight sensors on the chassis or on the pulling device, it is necessary to eliminate from the measuring values the disturbing influences which can be used for example by the advancement of the baler over the field. For example, ground unevenness can accelerate the baler in horizontal or vertical directions, or a descent of the ground in one direction can falsify the measuring results. Several possibilities can be utilized from the prior art, to filter out the disturbing influences. For example, corresponding disturbing values can be detected by a suitable sensor means or measuring values can be determined by a medium value formation from several measurements following shortly one after the other. In round balers, the weight can be also detected by weight sensors on the pulling device or the chassis. With a weight measurement during the throwing of the bale out, it is necessary to consider that it is located in movement, and the disturbing values from the movement can prevent the detection of the correct weight value In order to obtain a correct measuring value, it is proposed either to stop the round bale shortly for a weighing process, to detect the disturbing values by suitable sensors and filter them out, to form an average value by several measurements following shortly one after the other, or by weighing of individual or several pressure rollers which peripherally limit the pressure chamber, or by weighing the bale which is surrounded by the pressure belt.

In accordance with the inventive method of detecting the position-accurate product mass yield, the electronic control and/or regulating device of the baler during the time periods of forming a bale in defined time cycles detects the absolute or relative loading of a working element of the baler, and associates the corresponding measuring loading value with a position value determined by the device for determining the actual position. This value pair composed of the actual loading and the position is introduced by the electronic control and/or regulating device into an available storage and compared with the plurality of further value pairs, when a concrete weight value for a finished harvesting product bale is measured. From the concrete weight value and the number of the intermediately stored position-absolute or relative loading values then a concrete yield weight can be counted for a predetermined position. The position-related yield values can be further processed by the electronic control and/or regulating device to produce yield cards of a field. These yield cards can be used by telemetric cable or storage-supported transmission to evaluating units for method and/or operation optimization commands such as for example for the subsequent fertilization.

The proposed electronic control and/or regulating device is composed of at least one microprocessor which can process the above mentioned data with suitable software. The microprocessor can communicate with the proposed sensor system through a CAN-BUS network. It can be also provided with a suitable hardware peripherals for wireless communication, storage functions and indicating functions. For a maximum accurate measurement of the bale weight, moreover device for calibration of the weighing device can be provided. For this purpose in the control program of the electronic control and/or regulating device, an automatic or a keyboard-introducible nominal value setting of the weighing device can be provided, or adjustment of the weighing device can be performed from the calibrating weights. Instead of the load-induced quantity detection, the inventive device can be provided with a sensor means which detect the relative deviation of the supplied product mass by electronic sensors 46. These sensors sense the swath by mechanical, acoustic, optical or vide evaluating means and make possible a detecting of the yield deviation.

The inventive device can be used with insignificant adjustments also for green product mat machines. Instead of the weight value of a finished bound bale associated with the measuring swath thickness or the machine loading, in such a machine the weight of the continuously laying green product mat is detected and associated with the corresponding swath thickness or machine loads.

It will be understood that each of the elements described above, or two or more together, may also find a useful application in other types of constructions differing from the types described above.

While the invention has been illustrated and described as embodied in agricultural baler, and method of baling, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A baler for receiving, binding and discharging product masses, comprising receiving means for receiving a product mass; pressing means for compressing the product mass; binding means for binding the compressed product mass; discharging means for discharging the compressed and bound product mass; sensor means operatively connected with a working element of the baler for detecting, during a formation of a bale, a loading of the working element of the baler; a device for detecting an actual geographic position of the baler; a weighing device which weighs a finished bound harvesting product bale; and electronic means including an electronic device which is connected with said sensor means and with said detecting device for associating position values detected by said detecting device with loading values detected by said sensor means and intermediately storing a loading value of a position, said electronic device being also connected with said weighing device and, based on a weight of the finished bound bale determined by said weighing device and the position loading values detecting a weighed position-accurate value of a received product mass.

2. A baler as defined in claim 1, wherein said electronic device is a device selected from the group consisting of an electronic control device, and an electronic regulating device, and an electronic control and regulating device.

3. A baler as defined in claim 1, wherein said means are formed so that together they form a self-propelling baling machine.

4. A baler as defined in claim 1, wherein said means are formed so that together they form a pulled baling machine.

5. A baler as defined in claim 1, wherein said means are formed so that together they form a baling machine selected from the group consisting of a large baler, a round baler, a high pressure baler, and a compact roller baler.

6. A baler as defined in claim 1; and further comprising support means, at least one of said electronic device and said device for determining the geographical position being mounted on said support means.

7. A baler as defined in claim 1; and further comprising a pulling vehicle, at least one of said electronic device and said device for determining the geographical position being arranged on said pulling vehicle.

8. A baler as defined in claim 1, wherein said sensor means is formed as means selected from the group consisting of expansion measuring strip sensor means, rotary speed sensor means, and temperature sensor means.

9. A baler as defined in claim 1, wherein said sensor means is mounted on the working element selected from the group consisting of a drive shaft, a drive chain, a piston rod, a receiving device, a cutting device, a transporting device, a precompressing device, a preparation device, and a pressing device.

10. A baler as defined in claim 1, wherein said sensor means for determining the loading of the working element is formed as a sensor which senses a volume of the product mass received by the working element and is selected from the group consisting of a mechanical sensor, a capacitative sensor, an acoustic sensor, and an optical sensor.

11. A baler as defined in claim 1, wherein said sensing means for determining the loading of the working element is formed as means for sensing a volume of the product mass received by the working element and selected from the group consisting of an ultrasound sensor, a laser sensor, and a video sensor.

12. A baler as defined in claim 1, wherein said weighing means is formed as means which determine a weight value by weighing on an element selected from the group consisting of a draw bar, on one axial, one the discharge means, on a suspended collecting car, and during later lifting by another working machine for further transportation.

13. A baler as defined in claim 1, wherein said electronic means has a plurality of individual electronic elements which are connected with one another by a CAN-BUS Network.

14. A baler as defined in claim 1, wherein said electronic means is formed so as to convert a position-accurate associated weight value of the received product mass into a digital yield card.

15. A baler as defined in claim 14; and further comprising a further electronic unit; and means for transmitting one of the position-accurate weight value of the received product mass and the digital yield card from the electronic device to said further electronic unit through a communication selected from the group consisting of a cable, a telemetric communication, and a storage element.

16. A baler as defined in claim 15, wherein said storage element is an element selected from the group consisting of a chip card, a diskette, a magnetic band, and a compact disk.

17. A baler as defined in claim 15, wherein said further electronic unit is a unit selected from the group consisting of an indicating unit, an evaluating unit, and an indicating and evaluating unit.

18. A baler as defined in claim 1; and further comprising further sensor means for detecting a predetermined characteristic of the product mass and transmitting the determined characteristic to said electronic means for a further processing.

19. A baler as defined in claim 1; and further comprising storage means for receiving the detected characteristic for a further processing.

20. A baler as defined in claim 18; and further comprising a unit for receiving the detected characteristic and selected from the group consisting of an indicating unit, an evaluating unit, and an indicating and evaluating unit.

21. A baler as defined in claim 1; and further comprising binding means for binding the pressed product mass so that the product mass is discharged by the discharge means as a compressed and bound bale.

22. A baler as defined in claim 1, wherein said sensor means is formed to measure a weight value of a continuously discharging green product mat to supply the weight value to said electronic means.

23. A method of baling a product mass, in a baler having means for receiving a product mass, means for compressing the product mass means for binding the product mass to form a product bail, and electronic means, the method comprising the steps of operating the electronic means so that the electronic means during a formation of a product bale determine a loading of a working element, associated positions of the baler, and a weight of a finished bale, and then calculate for respective positions through a computation function, a weighed position-accurate value of the received product mass.

24. A baler for receiving, binding and discharging product masses, comprising receiving means for receiving a product mass; pressing means for compressing the product mass; binding means for binding the compressed product mass; discharging means for discharging the compressed and bound product mass; sensor means operatively connected with a working element of the baler for detecting, during a formation of a bale, a loading of the working element of the baler; a device for detecting an actual geographic position of the baler; a weighing device which weighs a finished bound harvesting product bale; and electronic means including an electronic device which is connected with said sensor means and with said detecting device for associating of position values detected by said detecting device with loading values detected by said sensor means and intermediately storing a loading value of a position, said electronic device being also connected with said weighing device and, based on a weight of the finished bound bale determined by said weighing device and the position loading values detecting a weighed position-accurate value of a received product mass; and means for calibrating said weighing means.

* * * * *

UNITED STATES PATENT AND TRADEMARK OFFICE
CERTIFICATE OF CORRECTION

PATENT NO. : 5,913,801
DATED : June 22, 1999
INVENTOR(S) : Bottinger, et al

It is certified that error appears in the above-identified patent and that said Letters Patent is hereby corrected as shown below:

ON THE TITLE PAGE:
    Assignee should be deleted and subtitute

CLAAS KGaA
        Harsewinkel, Germany

Signed and Sealed this

Twenty-ninth Day of August, 2000

Attest:

Q. TODD DICKINSON

*Attesting Officer*      *Director of Patents and Trademarks*